May 2, 1950     R. G. WHITE     2,506,185
BUN DUSTER
Filed June 26, 1948
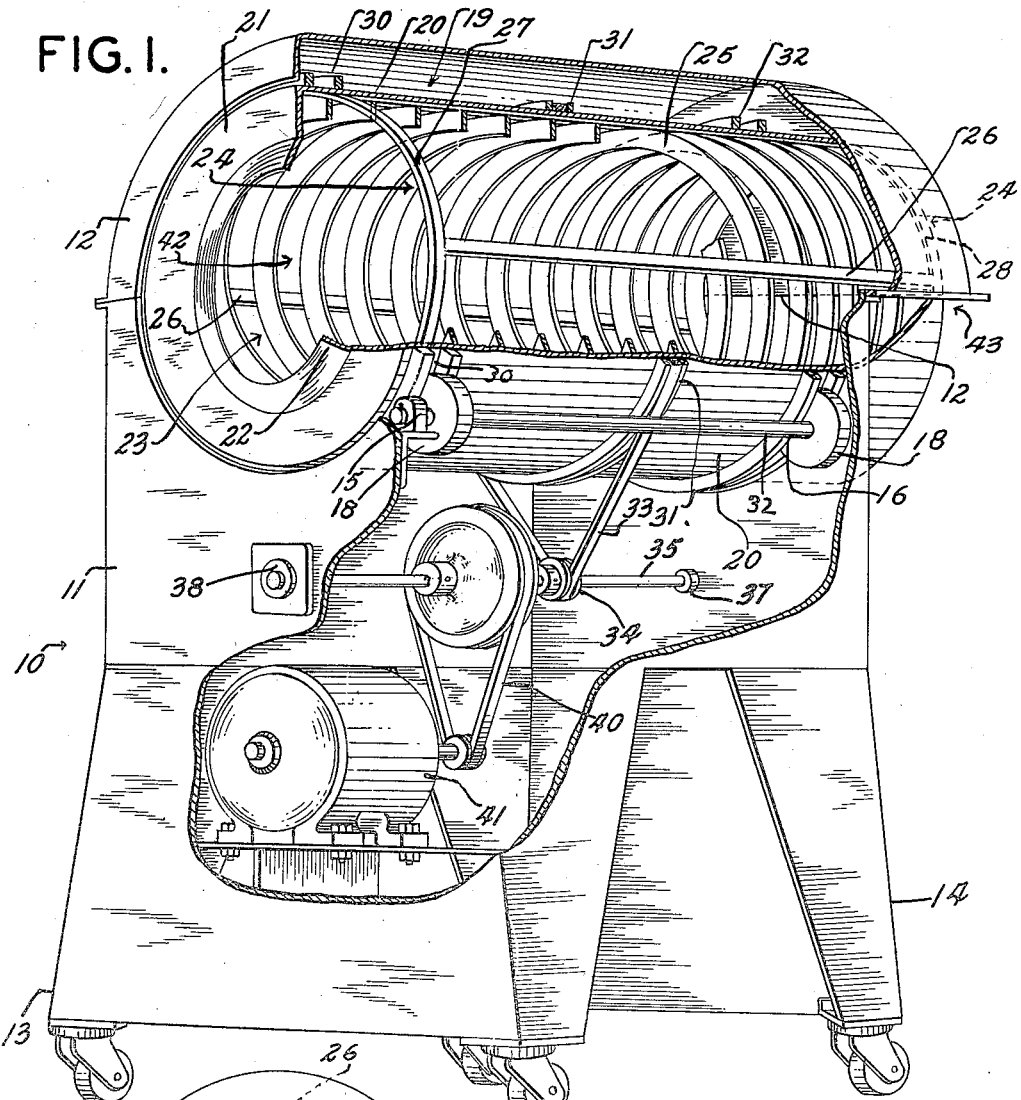
FIG. I.
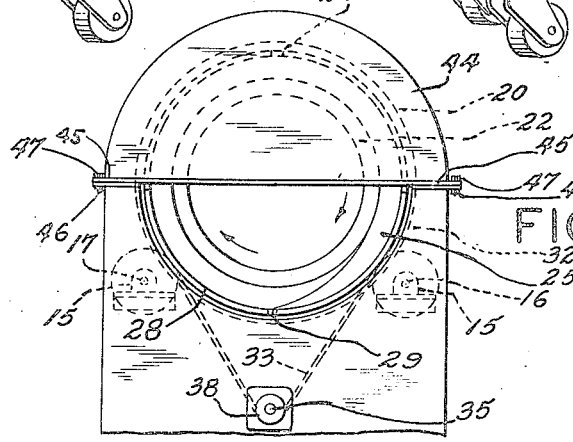
FIG. 2.
INVENTOR.
ROBERT G. WHITE
BY Campbell, Brumbaugh, Free & Graves
his ATTORNEYS.

Patented May 2, 1950

2,506,185

UNITED STATES PATENT OFFICE 2,506,185

BUN DUSTER

Robert G. White, Lynbrook, N. Y.

Application June 26, 1948, Serial No. 35,406

4 Claims. (Cl. 91—7)

This invention relates to devices used in the bakery art for coating buns with flour. Heretofore this has been accomplished by sprinkling the buns with flour after they have been separated or by otherwise manually manipulating the buns or the flour or both. Not only are the manual methods of bun-dusting relatively slow when compared with other baking operations but they are wasteful of flour since a uniform distribution of flour is difficult to obtain. Moreover it has also been necessary for the person dusting the buns to separate them as they come from a roll dividing or similar mechanism.

The object of this invention is to provide mechanical means for separating rolls or buns that will perform with speed and efficiency superior to the manual operation.

Another object of this invention is to provide a mechanism that will avoid wastage of flour in the dusting operation.

These objects are attained by the use of a substantially horizontal rotating drum having a mechanism for feeding the rolls or buns within and along the drum while tumbling them about and applying flour over their surfaces. This drum includes a frame having a helical rib secured within it and a covering of sheet metal. Flour is placed within the drum and rotation of said drum, which may be effected by a belt drive, distributes the flour uniformly therein. Rolls or buns to be coated with flour are fed into one end of the drum and, by means of a helical rib, are carried through the drum. During their passage through the drum, the rolls or buns are tumbled about and brought into contact with the flour carried by the inside of the drum and thus become coated with flour themselves. When the buns have been carried to the discharge end of the drum, they are ejected by the action of the helical rib.

For a more complete understanding of the invention, reference will be made to the accompanying drawings in which;

Figure 1 is a perspective view of a bun dusting mechanism constructed in accordance with the present invention, parts of the housing and drum being broken away to reveal certain details of construction, and Figure 2 is a partial view in front elevation of the upper part of the device showing the discharge end of the drum.

As may be seen from Figure 1, the entire mechanism is enclosed in a housing 10 consisting of a body 11, a removable cover 12 and legs 13 and 14. The body 11 of the housing 10 is rectangular in cross-section and has secured to its inner surface near each of its corners, four bearings such as 15 only one of which is shown in Figure 1. In these bearings are journaled the ends of longitudinal shafts 16 and 17 near the end of which are positioned four rubber covered rollers 18, two on each shaft.

Rubber rollers 18 form the means for supporting the drum 19 which lies with its axis horizontal. The drum 19 comprises a shell 20 of sheet metal or the like, an annular end plate 21 having a flange 22 surrounding an opening 23, a frame 24 and a helical worm or vane 25. The shell 20 fits around the outside of frame 24 while, as shown in Figure 1, vane 25 is secured inside the longitudinal bands 26 of which there are four, angularly spaced at about 90° from one another. The longitudinal bands 26 serve to space apart annular bands 27 and 28 to which the ends of worm 25 are secured as at 29 (Figure 2) by welding or similar means.

The shell 20 of drum 19 is provided with three sets of circumferential tracks 30, 31 and 32. Tracks 30 and 31 are each supported upon two of the four rubber covered rollers 18 adjacent the respective ends of the drum 19. Centrally located track 31 is adapted to receive belt 33 which passes around drum 19 and when driven effects the rotation of the drum about its horizontal axis. Belt 33 runs over a pulley 34 which is mounted on a drive shaft 35. The ends of shaft 35 are journaled in bearings 37 and 38 which are secured to the sides of body 11 of housing 10. Also mounted on shaft 35 is a drive pulley 39 which is turned by a belt 40 which is driven by electric motor 41.

In operating the device flour is placed within rotating drum 19 and becomes distributed over its inner surface 45. It will be noted that the possibility of the vane 25 carrying flour along the drum and ejecting it at discharge end 43 is obviated by the fact that vane 25 is spaced from inner surface 42 by the thickness of longitudinal bands 26. Rolls or buns to be dusted are fed from a dough divider into the drum 19 through intake opening 23. The diameter of opening 23 is substantially smaller than the inside diameter of drum 19 to prevent inadvertent ejection of the buns and flour and is surrounded by annular flange 22 which helps prevent discharge of the contents of drum 19.

Inasmuch as the drum 19 is rotating in a clockwise direction when viewed from the discharge end of the device (see arrows in Figure 2) the helical vane 25 moves the buns along the drum 19 towards discharge end 43. While passing through the drum 19, the buns are tumbled about the flour-coated inner surface 42 and are uniformly coated with flour. The floured pieces are discharged through discharge opening 43 onto a conveyor (not shown). The cover 12 is formed with an end plate 44 which extends over the upper portion of the end of drum 19 thus limiting the area of the discharge opening 43 to a semicircle. In this fashion discharge of the buns by vane 25 is suitably controlled. The cover 12 is provided with flanges 45 which are secured to corresponding flanges 46 of body 11 by bolts 47. The cover 12 may be removed when access to the drum 19 is desired for purposes of cleaning or repairing it.

It has been found in practice that the above-described device uses considerably less flour and applies it more uniformly than is possible by the use of sifters and other devices used heretofore.

It should be understood that the above-described embodiment of the invention is susceptible to considerable modification without departing from the invention. Therefore, the apparatus disclosed herein should be considered as illustrative and not as limiting the scope of the following claims.

I claim:

1. A device for coating pieces of dough with flour comprising a housing, a hollow cylindrical drum mounted in said housing, a helical vane coaxial with and spaced inwardly from said drum and means for rotating said drum to move objects placed therein through said drum.

2. A device for coating pieces of dough with flour comprising a housing, a hollow cylindrical drum mounted in said housing, a frame within said drum comprising a plurality of spaced-apart annular bands, a helical vane coaxial with and fixed to said frame and extending inwardly therefrom and means for rotating said drum to move objects placed therein through said drum.

3. A device for coating pieces of dough with flour comprising a housing, a hollow cylindrical drum, said drum having at one end a discharge opening and an intake opening at its other end, said intake opening being substantially smaller in diameter than the inside diameter of said drum, a plurality of annular bands secured in said drum in axially spaced apart relation, a helical vane coaxial with and fixed to said annular bands and extending inwardly therefrom, and means for rotating said drum to move objects placed therein through said drum.

4. A device for coating pieces of dough with flour comprising a housing, a hollow cylindrical drum mounted within said housing, said drum having an intake opening at one end and a discharge opening at the opposite end, the diameter of said intake opening being substantially smaller than the inside diameter of said drum, a plurality of annular bands fixed in said drum in axially spaced apart relation, a plurality of longitudinal bands secured to said annular bands and extending lengthwise of said drum, a helical vane coaxial with and fixed to said annular bands and extending inwardly therefrom, said vane being supported by said annular and longitudinal bands in spaced relation to said drum, and means for rotating said drum to move objects placed therein through said drum.

ROBERT G. WHITE.

REFERENCES CITED

The following references are of record in the file of this patent:

UNITED STATES PATENTS

| Number | Name | Date |
|---|---|---|
| 1,012,877 | Mahan | Dec. 26, 1911 |
| 1,315,665 | Hamilton | Sept. 9, 1919 |
| 1,739,642 | Light | Dec. 17, 1929 |